Oct. 21, 1924.
J. W. MERRITT
CHIPPING TOOL
Filed April 11, 1921
1,512,355
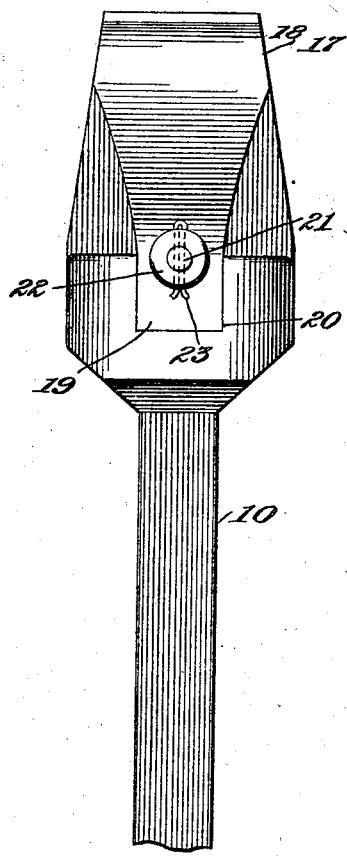
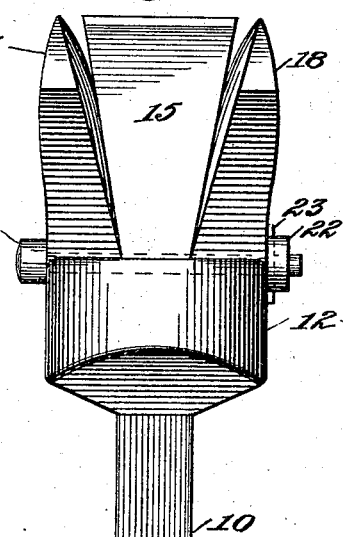
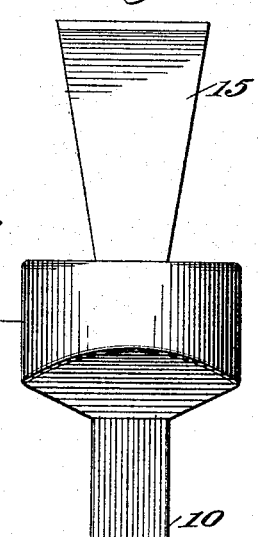
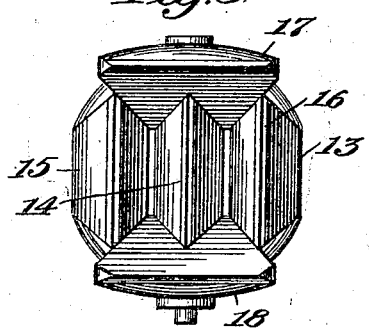
Inventor:
James W. Merritt,
By Cushman, Bryant & Darby
Att'ys.

Patented Oct. 21, 1924.

1,512,355

UNITED STATES PATENT OFFICE.

JAMES WALTER MERRITT, OF NORFOLK, VIRGINIA.

CHIPPING TOOL.

Application filed April 11, 1921. Serial No. 460,159.

*To all whom it may concern:*

Be it known that I, JAMES WALTER MERRITT, a citizen of the United States, residing at Norfolk, in the county of Norfolk and State of Virginia, have invented new and useful Improvements in Chipping Tools, of which the following is a specification.

This invention relates to a tool intended, primarily, though not exclusively, for use in removing rust and the like from the hulls and interior rivet heads of ships.

As is well known to those skilled in the art, it is a rather slow and tedious operation to cut or chip away the rust from the hulls and rivet heads of ships, the entire operation being performed, at the present time, generally by a pneumatic tool provided with a single cutting bit similar to a chisel.

The present invention relates to an improved bit construction adapted to be used in connection with the pneumatic mechanism for the chipping operation.

An objection to the ordinary bit construction having but a single cutting edge lies in the fact that there is a tendency for the same to cut into the hull around the rivet heads where the hull is calked. Another objection to the ordinary chisel type of bit is that it has but a small bearing and cutting surface, thus rendering the chipping operation very slow and, necessarily, somewhat expensive.

The object of the present invention is to provide a cutting or chipping member which will overcome the above mentioned objections to the ordinary chipping tool, thereby permitting the performance of the cleaning operation at a considerably reduced expense and without cutting away the calked portions of the hull around the rivet heads.

The above and other objects of the invention, which will become obvious as the description proceeds, are attained by the provision of a tool having a plurality of cutting bits arranged with their cutting edges extending in angularly related planes. More specifically, the invention contemplates the provision of a tool having a plurality or series of bits having substantially parallel cutting edges and an additional bit provided with a cutting edge extending at an angle to the planes of the cutting edges of the parallel series of bits.

In the accompanying drawings there is shown one form of a device in which my invention may be embodied, and in said drawings:

Fig. 1 is an elevational view of the tool with a portion of the shank or handle broken off, Fig. 2 is an elevational view taken at right angles to the view shown in Fig. 1, Fig. 3 is an end view showing more clearly the relation of the cutting bits, and Fig. 4 is a view similar to Fig. 2 showing the tool with the side bits removed.

Referring to the drawings for a more detail description, 10 indicates a shank having a reduced end portion 11 adapted to fit into a socket in the pneumatic tool, the shank being of sufficient length to permit the same to be grasped and steadied by the hand during the chipping operation.

The shank terminates in an enlarged head 12 from which extend a plurality or series of bits 13, 14, 15 formed with beveled cutting edges 16 arranged in substantial parallelism and slightly spaced apart. As shown in the drawings, these bits or blades are fixedly formed on the head 12, but, of course, may be made removable if desired. However, due to the spaced relation of the cutting edges, it is unnecessary that the bits be removable since they may be sharpened by an emery wheel which will readily fit between the several bits. Although there is shown in the illustrated embodiment of the invention a tool having three bits, it should be understood that the number may be varied as desired, there being a particular advantage in having a plurality of bits since an increased bearing and cutting surface is provided for work along the smooth surfaces of a ship's hull. Also, when work is being performed around the rivet heads the spacing of the cutting edges a substantial distance apart permits of the tapered head of the rivet to be placed between the cutting edges, thereby affording a steady bearing surface during the chipping operation around the rivet head. When the chipping operation is being performed around a projecting rivet head with an ordinary chisel type of tool having but a single cutting edge it is somewhat difficult to steady the tool and cause the same to accurately follow the tapered and curved surface of the rivet head since there is a tendency for the tool to slip under the percussions of the pneumatic mechanism. This is due to the fact that there is but a single cutting edge affording but a narrow bearing surface for the tool.

In the chipping operation there is a considerable amount of work to be done in removing rust from rivet heads which do not project beyond the surface of the ship's wall, but which are countersunk in the wall and entirely flush with the surface. The wall is generally calked around these rivet heads and it is desirable that the rust be removed without cutting away the calk. This, however, is very difficult to avoid when the ordinary chisel type of bit is used for the reason that there is a natural tendency for the narrow cutting edge to slip into the space around the rivet head, particularly since the guiding of the tool is somewhat difficult, as above described. My invention contemplates the provision of means to prevent the cutting away of the calking of these rivet heads and at other points. This means may take the form of an additional bit 17 having a cutting edge located in a plane at an angle to the planes of the cutting edges of the series of bits, 13, 14 and 15. As shown in the drawings, this additional bit is located at the side of the series and, if desired, another and similarly positioned bit 18 may be arranged on the opposite side of the series with its cutting edge in parallelism with the cutting edge of the bit 17.

The bits 17 and 18 may be removably positioned in the tool head for the purpose of permitting their resharpening, together with the sharpening of the bits 13, 14 and 15. Each of the bits 17 and 18 has a reduced shank 19 extending into a socket 20 in the head 12, and a bolt 21 may extend through the head and through openings in the bits to lock them in position, the bolt being provided upon one end with a lock washer 22 and a cotter pin 23.

Obviously, the invention is not limited to the particular construction above described, since the description and drawing are merely illustrative and in no sense restrictive of the invention, which is more clearly defined in the following claims.

What I claim is:

1. A device of the class described comprising a series of bits having spaced substantially parallel cutting edges, a bit positioned at each side of said series of bits having its cutting edge extending at substantially right angles to the cutting edges of said series, at least one of said last mentioned bits being removable.

2. A device of the class described comprising a series of bits having spaced substantially parallel cutting edges, a removable bit positioned at each side of said series of bits having its cutting edge extending at substantially right angles to the cutting edges of said series.

3. A device of the class described comprising a stock, a series of bits projecting from said stock and having spaced substantially parallel cutting edges, a bit positioned at each side of said series of bits having its cutting edges extending at an angle to the cutting edges of said series, and means removably securing said last mentioned bits to said stock.

In testimony whereof I have hereunto set my hand.

JAMES WALTER MERRITT.